US012734735B2

(12) United States Patent
Seidel et al.

(10) Patent No.: US 12,734,735 B2
(45) Date of Patent: Sep. 15, 2026

(54) TRANSLUCENT MULTI-LAYER BODY WITH A HEAT- OR PRESSURE-SENSITIVE DECORATIVE LAYER

(71) Applicant: Covestro Deutschland AG, Leverkusen (DE)

(72) Inventors: Andreas Seidel, Dormagen (DE); Ciro Piermatteo, Leverkusen (DE); Torsten Thust, Wermelskirchen (DE)

(73) Assignee: Covestro Deutschland AG, Leverkusen (DE)

( * ) Notice: Subject to any disclaimer, the term of this patent is extended or adjusted under 35 U.S.C. 154(b) by 170 days.

(21) Appl. No.: 18/845,093

(22) PCT Filed: Mar. 9, 2023

(86) PCT No.: PCT/EP2023/055958

§ 371 (c)(1),
(2) Date: Sep. 9, 2024

(87) PCT Pub. No.: WO2023/174782

PCT Pub. Date: Sep. 21, 2023

(65) Prior Publication Data

US 2025/0178253 A1 Jun. 5, 2025

(30) Foreign Application Priority Data

Mar. 16, 2022 (EP) .................................... 22162419

(51) Int. Cl.
*B29C 45/00* (2006.01)
*B29C 45/14* (2006.01)
(Continued)

(52) U.S. Cl.
CPC ...... *B29C 45/0001* (2013.01); *B29C 45/1418* (2013.01); *B29C 45/14811* (2013.01); *B29K 2067/00* (2013.01); *B29K 2069/00* (2013.01)

(58) Field of Classification Search
None
See application file for complete search history.

(56) References Cited

U.S. PATENT DOCUMENTS 3,419,634 A 12/1968 Vaughn, Jr.
3,553,167 A 1/1971 Schnell et al.
(Continued)

FOREIGN PATENT DOCUMENTS

DE 2232877 A1 1/1974
DE 3007934 A1 9/1981
(Continued)

OTHER PUBLICATIONS

H. Schnell, "Chemistry and Physics of Polycarbonates", Interscience Publishers, 1964.
(Continued)

*Primary Examiner* — Samir Shah
(74) *Attorney, Agent, or Firm* — John E. Mrozinski, Jr.; Richard P. Bender

(57) ABSTRACT

The invention relates to a multi-layer body, comprising (I) a carrier layer made of a special thermoplastic polycarbonate molding compound and (II) a layer made of a material selected from the group consisting of stone products, hide products, textile fabrics containing synthetic fibers, materials of plant origin or materials containing components of plant origin, or laminates containing one or more of the aforementioned materials, wherein the layer (II) has either a specified minimum transmission or at least one recess in the shape of at least one symbol, a pattern, a hole, a line, or a sign, or the layer has punctiform recesses. The invention also relates to a lighting unit, comprising the multi-layer body and a light source, to a method for producing the multi-layer
(Continued)

body, and to the use of the special thermoplastic polycarbonate molding compound as a carrier layer of such a multi-layer body.

14 Claims, 1 Drawing Sheet

(51) Int. Cl.

| | |
|---|---|
| *B29K 67/00* | (2006.01) |
| *B29K 69/00* | (2006.01) |

(56) References Cited

U.S. PATENT DOCUMENTS

| | | | |
|---|---|---|---|
| 3,644,574 | A | 2/1972 | Jackson, Jr. et al. |
| 4,013,613 | A | 3/1977 | Abolins et al. |
| 4,075,173 | A | 2/1978 | Maruyama et al. |
| 4,097,446 | A | 6/1978 | Abolins et al. |
| 4,269,964 | A | 5/1981 | Freitag et al. |
| 4,311,823 | A | 1/1982 | Imai et al. |
| 4,334,053 | A | 6/1982 | Freitag et al. |
| 4,584,360 | A | 4/1986 | Paul et al. |
| 6,547,910 | B1 | 4/2003 | Benzing et al. |
| 6,588,924 | B1 | 7/2003 | Friepes |
| 6,719,938 | B2 | 4/2004 | Summerer |
| 8,083,979 | B2 | 12/2011 | Hayes et al. |
| 8,168,110 | B2 | 5/2012 | Niebling et al. |
| 10,173,355 | B2 | 1/2019 | Leonhardt et al. |
| 11,938,663 | B2 | 3/2024 | Gruenthaner |
| 2013/0265776 | A1 | 10/2013 | Zollner et al. |
| 2020/0407547 | A1* | 12/2020 | Seidel ..................... C08L 55/02 |
| 2023/0311449 | A1* | 10/2023 | Seidel ..................... B32B 7/023 428/35.7 |
| 2025/0188637 | A1* | 6/2025 | Seidel .................... C25D 5/022 |

FOREIGN PATENT DOCUMENTS

| | | | |
|---|---|---|---|
| DE | 3832396 | A1 | 2/1990 |
| DE | 102007011338 | A1 | 9/2008 |
| DE | 102008028608 | A1 | 12/2009 |
| EP | 2402140 | A1 | 1/2012 |
| GB | 1552558 | A | 9/1979 |
| WO | 2017009152 | A1 | 1/2017 |
| WO | 2019170569 | A1 | 9/2019 |
| WO | 2021063718 | A1 | 4/2021 |

OTHER PUBLICATIONS

W. Scholtan, H. Lange, Kolloid-Z. und Z. Polymere 250 (1972), pp. 782-796.

Ullmanns Enzyklopädie der Technischen Chemie [Ullmann's Encyclopedia of Industrial Chemistry], vol. 19 (1980), p. 280 ff.

International Search Report, PCT/EP2023/055958, date of mailing: May 30, 2023, Authorized officer: Benedikt Schlicke.

* cited by examiner

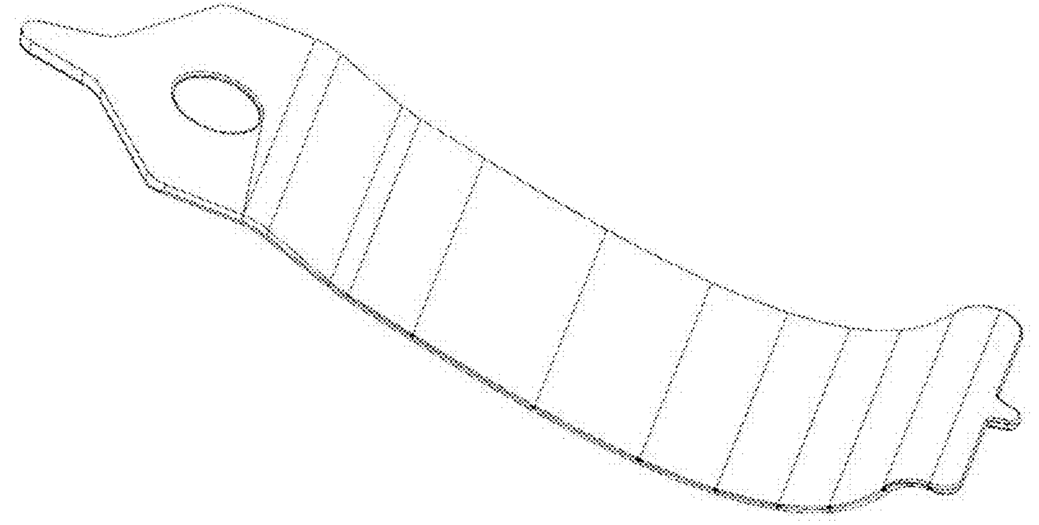

TRANSLUCENT MULTI-LAYER BODY WITH A HEAT- OR PRESSURE-SENSITIVE DECORATIVE LAYER

CROSS REFERENCE TO RELATED APPLICATIONS

This application is a national stage application under 35 U.S.C. § 371 of PCT/EP2023/055958, filed Mar. 9, 2023, which claims benefit of EP Application Serial No. 22162419.0, filed Mar. 16, 2022, both of which are incorporated herein by reference in their entireties.

The present invention relates to a multilayer article comprising a carrier layer composed of a thermoplastic polycarbonate molding compound and a heat- or pressure-sensitive decorative layer, to a lighting or display unit comprising the multilayer article and a light source, to a process for producing the multilayer article and to the use of a thermoplastic polycarbonate molding compound as a carrier layer of such a multilayer article.

BACKGROUND OF THE INVENTION

Decorative ambient lighting elements or backlit functional/display elements are increasingly being used in automotive interiors and in automotive body applications. A market trend is to switch on/fade in the lighting or the display of functions only when required, for example in order to differentiate the appearance of such elements from day to night or to intensify the perception of space in the automotive interior using such ambient dynamic lighting or to allow needs-based and situation-appropriate display of information.

These lighting or functional elements are for example completely or partially transilluminable decorative strips, decorative panels, trim panels, steering wheel covers, consoles, handles or instrument panel carriers or control elements that can be used to operate various functions of the vehicle, for example start/stop buttons and control elements for vehicle lighting or climate control, or display elements that can be used to display information as needed.

Such component parts or component elements are generally produced from technical thermoplastics since they allow high component part individuality and function integration in forming processes that are simple and cost-effective to realize on a large industrial scale, in particular injection molding.

In the case of such component elements with a decorative function there is often a desire to provide the visible surface with a decorative layer with the aim of adapting its optics, haptics and/or resistance to environmental influences, for example the light-, UV- or heat-resistance of the surface appearance, the chemicals resistance or the scratch resistance, to the technical requirement profiles of such component parts or the customer demand for high-quality and differentiated component part appearance. This is achievable for example and preferably in injection molding in an in-mold decoration process (IMD) when the decorative layer is introduced into the injection mold and subsequently subjected to film-insert molding with a thermoplastic molding compound. In this context especially surfaces with the appearance of a natural material (for example wood, stone or leather) or a textile are in great demand—especially in the field of luxury vehicles. Such component parts are producible by employing in an IMD process layers of stone, animal hide products, textile fabrics containing or consisting of synthetic fibers, materials of vegetable origin or containing constituents of vegetable origin, for example wood, cork, silk, natural fiber-containing textiles or paper or laminates containing one or more of the recited materials.

If these layers are sufficiently thin they are transilluminable by light in the visible wavelength range (from 380 to 780 nm) with good light yield from a light source, for example an LED. Provided the carrier layer made of the thermoplastic molding compound also has a sufficient light transmittance in the visible wavelength range, the multilayer component parts are able to exhibit a differentiated day/night surface appearance. In day mode these component parts have the appearance of the decorative layer, i.e. the natural material or textile for example. In night mode the component parts transilluminated by a light source can be used as a diffuse lighting element for the realization of exceptional ambient lighting scenarios. If the reverse side of the decorative layer is partially coated with a layer that is non-transparent to light and/or the decorative layer itself is impermeable to light but in subregions is provided with breakthroughs in the form of for example shapes, lines, characters or symbols, such component parts moreover allow the representation of patterns or information or selective illumination of specific functional elements/functional regions in the multilayer component part as required.

However, such decorative layers made of the above-described materials, especially when made thin enough to be transilluminable, are often sensitive to heat, i.e. temperature, and/or pressure. If the IMD process in the production of the multilayer component part employs high temperatures or pressures this therefore often leads to high component part scrap rates on account of thermal scorching on the decorative layer which becomes apparent for example in the form of color changes at least on the side of the multilayer article produced in the IMD process that is facing the thermoplastic and upon transillumination of said article, in particular in the region of the gate sites. Or scrap is formed due to deformation of the decorative layer such as for example local delamination, bubbling/orange peeling of the decorative layer and/or due to mechanical damage to the decorative layer which especially in the case of brittle materials, for example stone, leads to cracking, spalling or in the worst case complete destruction (bursting, popping, shattering) of the decorative layer.

Multilayer component parts having a heat- or pressure-sensitive decorative layer and processes for producing these are known in principle.

DE 102018127648 (B3) discloses a process for producing a molded part, in particular a decorative part and/or trim part for a vehicle interior with optically high quality decor and attractive haptics in the form of a molded part, wherein the molded part comprises a wood veneer as a decorative layer and a carrier. The process according to the invention comprises film-insert molding of a wood veneer provided for forming the decorative layer with a carrier material, in particular with a plastic, preferably an ABS (acrylonitrile-butadiene-styrene copolymer) plastic to form the carrier.

EP 2301736 A1 discloses a multilayer plastic composite component part, in particular for use as a decorative applique or decorative panel in the automotive field and to a process for production thereof comprising subjecting a decorative layer of for example a wood veneer, a laminate, a textile or a paper substrate to film-insert molding, preferably at a low pressure.

DE 19910241A1 discloses a display unit, in particular for a vehicle, which has a display front provided with characters which comprises a transparent section and a substantially light-impermeable section enclosed by the transparent section and which comprises a light source arranged behind the display front for illumination by transillumination, wherein the substantially transparent section is formed by a breakthrough in the display front and the substantially light-impermeable section is arranged on a transparent carrier. The display front is produced from a light-impermeable material, for example wood, materials, fabrics, veneers or else a thin film.

WO 2017009152A1 discloses a wood-veneered plastic molded article containing a main body made of fiber-reinforced plastic and a wood veneer which forms or covers at least a surface region of the plastic molded article and a process for producing such a plastic molded article, wherein the main body made of a fiber-reinforced plastic is heated to a temperature which is preferably 10° C. to 50° C. higher than a melting point or a glass transition temperature of the plastic matrix of the main body, thus thermally bonding at least a region of the main body with the wood veneer.

DE 102008028608A1 discloses a process for producing a component part comprising a surface decoration where the surface decoration comprises a stone decoration on a carrier component part made of plastic wherein the stone decoration is subjected to film-insert injection molding, film-insert pressing or film-insert blow molding with a plastic material such as acrylonitrile-butadiene-styrene terpolymer (ABS), polycarbonate (PC), blends of polycarbonate and acrylonitrile-butadiene-styrene terpolymer (PC/ABS), polymethyl methacrylate (PMMA), polystyrene (PS) or polyurethane (PUR). A preferred development of the invention provides at least for light-transparent sections in the region of the stone decoration.

DE 19909869C2 discloses a process for producing a trim piece where a thin decorative layer is applied to a carrier element using adhesive material, wherein the thin decorative layer is made of an organic and/or crystalline material which in thin layers is prone to fracturing, especially of natural stone.

WO 2021063718 A1 discloses an LED lighting unit comprising a multilayer article and an LED light source, wherein the multilayer article is composed of the following layers in the following sequence: a1) a carrier layer made of a thermoplastic composition, a2) a natural stone layer, a3) a transparent layer made of a thermoplastic composition. Thermoplastic compositions suitable for forming the layers a1) and/or a3) include polycarbonate-based compositions.

EP 1144177B1 discloses a process for producing a composite molded part where a flexible upper material, in particular a decorative material such as fabric, leather, film or the like, is subjected to film-insert molding with plastic at a very low pressure within a cavity formed between a cavity mold plate and a mold core. During the film-insert molding care must be taken to ensure that the often sensitive upper materials are not damaged.

For an appealing visual impression of the multilayer article in the transilluminated state it is also desirable for the plastic main carrier to scatter the light from a point light source, for example an LED, at least to a certain extent and thus realize a diffuse illumination appearance of the transilluminated component part. Otherwise, the light source would be visible to the observer and/or the desired visual effect upon activating the light source would be limited to only a small region of the multilayer article. In some cases gate marks for the injection molding process are unavoidably arranged in the visible region of the multilayer article on the side of the plastic main carrier facing away from the visible side of the multilayer article provided with the decorative layer especially in the case of thin-walled, large surface area and/or geometrically complex component parts. Insufficient light diffusivity of the plastic carrier then has the undesirable result that upon transillumination of the multilayer article on its visible side these gate marks become visible and thus adversely affect the high-quality appearance of the lighting body. In order to achieve a thus desirable diffuse light impression of a surface of the multilayer article transilluminated by a point light source it is necessary for the carrier layer on the one hand to have a highest possible transmittance of the incident visible light and on the other hand to have a highest possible scattering-induced light diffusivity, i.e. a highest possible half power angle, of the light cone resulting from passage through the carrier layer of a point light source. The higher this half power angle, the more spatially homogeneous the perceived illumination intensity of the light emitted by a point light source after passing through the carrier layer, and the less gate marks or other visual defects resulting in the injection molding process on the side of the plastic main carrier facing away from the visible side are visible to adverse effect on the visible side of the transilluminated multilayer article upon transillumination. Greater light diffusion half power angles of the carrier layer also allow larger areas to be transilluminated by point light sources with a spatially largely homogeneous light intensity. Transmittance and light diffusivity (half power angle) of a material are generally not adjustable independently of one another and generally run counter to one another. Optimizing light diffusivity through material modification, for example by altering the composition thereof, generally results in decreasing transmittance. Both variables are in particular also dependent on the transilluminated material layer thickness, wherein with increasing layer thickness the transmittance of a translucent material decreases and the light diffusivity increases.

Such component parts/component elements for interior and exterior applications in automobiles are also subject to further performance demands, for example high material ductility especially also at low temperatures, high heat distortion resistance and dimensional stability. Thermoplastics suitable for such applications and thus established in such fields of use such as polycarbonate, acrylonitrile-butadiene-styrene terpolymers (ABS) and blends of these two thermoplastics either have an excessively high melt viscosity and therefore require high melt temperatures and/or high injection pressures in the injection molding process, especially in the production of complex, large surface area and/or thin carrier layers. This leads to the problems described above when using heat- and/or pressure-sensitive decorative layers (high scrap rates in the production process). Or the thermoplastics have inadequate mechanical properties and/or light diffusivity. This applies especially to transparent polycarbonate or polycarbonate compounds provided with scattering additives. However, ABS plastics, ABS/PC or PC/ABS blends employed in the prior art in such applications, which are in principle usable in injection molding at lower melt temperatures and injection pressures on account of their lower melt viscosity than polycarbonate and generally have a high light diffusivity, furthermore exhibit insufficient light transmittance, i.e. the use thereof for producing the multilayer component parts leads to insufficient light yield on the visible side of the component part upon backlighting.

DETAILED DESCRIPTION OF THE INVENTION

It was therefore desirable to produce a multilayer article which is diffusely transilluminable with improved light yield and which has an aesthetic appearance which is improved in the non-transilluminated state and/or in the transilluminated state containing a main carrier made of a thermoplastically processable material and a heat- and/or pressure-sensitive decorative layer selected from the group consisting of stone product, animal hide product, textile fabric containing synthetic fibers, material of vegetable origin or containing constituents of vegetable origin or laminate containing one or more of the recited materials. The thermoplastically processable material shall fulfill the general performance requirements demanded by the automotive industry of materials for producing component parts for use in interior and exterior applications and shall be processable in an IMD process at low melt temperatures and injection pressures, thus improving the quality of the multilayer articles and/or reducing scrap rates in the production process. It was further desirable to provide a process for producing such a multilayer article in which the decorative layer is applied to the carrier made of thermoplastic molding compound via an IMD process.

To this end it was necessary for the carrier material to exhibit a combination of improved transmittance for light in the visible wavelength range and high light diffusivity (i.e. a high half power angle) as well as good thermoplastic processing characteristics (i.e. low melt viscosity/high melt flowability), high material ductility especially also at low temperatures and high heat distortion resistance.

It has surprisingly been found that the abovementioned object is achieved by a multilayer article comprising (I) a carrier layer composed of a thermoplastic molding compound containing A) at least one representative selected from the group consisting of aromatic polycarbonate and aromatic polyester carbonate, B) rubber-modified vinyl (co)polymer composed of B.1) 80% to 95% by weight, based on the rubber-modified vinyl (co)polymer B, of structural units derived from at least one vinyl monomer and B.2) 5% to 20% by weight, based on the rubber-modified vinyl (co)polymer B, of one or more elastomeric graft substrates having glass transition temperatures <−50° C. and containing at least 50% by weight, based on B.2, of structural units derived from 1,3-butadiene, wherein the rubber-modified vinyl (co)polymer B contains (i) a disperse phase consisting of (i.1) rubber particles grafted with vinyl (co) polymer composed of structural units of B.1 and (i.2) vinyl (co)polymer likewise composed of structural units of B.1 enclosed in the rubber particles as a separate disperse phase and (ii) a rubber-free vinyl (co)polymer matrix consisting of structural units of B.1 which is not bonded to the rubber particles and is not enclosed in these rubber particles, wherein the disperse phase of (i) has a median diameter D50 measured by ultracentrifugation of 0.7 to 2.0 μm, C) optionally at least one further component selected from polymer additives and polymeric blend partners, wherein the thermoplastic molding compound contains less than 2% by weight of rubber-based graft polymers distinct from component B) and wherein the thermoplastic molding compound has a rubber content of at least 1.5% by weight, and (II) a layer of a material selected from the group consisting of stone product, animal hide product, textile fabric containing synthetic fibers, material of vegetable origin or containing constituents of vegetable origin or laminate containing one or more of the recited materials, wherein the layer (II) at least in subregions at its actual local thickness at at least one wavelength in the wavelength range of the spectrum from 380 to 780 nm has a transmittance of at least 25%, preferably of at least 40% and most preferably of at least 50%, wherein the transmittance is determined from the transmission spectrum measured according to the specifications in DIN/ISO 13468-2, 2006 version, or wherein the layer (II) has a transmittance of less than 25% in the entire wavelength range of the spectrum from 380 to 780 nm, wherein the transmittance is determined from the transmission spectrum measured according to the specifications in DIN/ISO 13468-2, 2006 version, and wherein the layer (II) comprises at least one cutout in the shape of at least one symbol, one pattern, one hole, one line or one character or comprises punctate cutouts arranged in the shape of at least one symbol, one pattern, one hole, one line or one character.

In the case where the layer (II) at least in subregions at its actual local thickness has a transmittance of at least 25%, preferably of at least 40% and most preferably of at least 50% at at least one wavelength in the wavelength range of the spectrum from 380 to 780 nm, wherein the transmittance is determined from the transmission spectrum measured according to the specifications in DIN/ISO 13468-2, 2006 version, the layer may optionally comprise at least one cutout in the shape of at least one symbol, one pattern, one hole, one line or one character or comprise punctate cutouts arranged in the shape of at least one symbol, one pattern, one hole, one line or one character.

In a preferred embodiment, the thermoplastic molding compound of the carrier layer (I) contains 30% to 85% by weight, more preferably 50% to 82% by weight, yet more preferably 58% to 82% by weight, most preferably 65% to 75% by weight, of component A, 14% to 69% by weight, more preferably 17% to 49% by weight, yet more preferably 17% to 41% by weight, most preferably 24% to 34% by weight, of component B, 0.05% to 20% by weight, more preferably 0.1% to 10% by weight, yet more preferably 0.2% to 5% by weight, most preferably 0.3% to 2% by weight, of component C.

In a preferred embodiment the molding compound of the carrier layer (I) contains less than 1% by weight, more preferably less than 0.5% by weight, yet more preferably less than 0.2% by weight, of rubber-based graft polymers distinct from component B). The molding compound most preferably contains no rubber-based graft polymers distinct from component B).

In a preferred embodiment, the molding compound of the carrier layer (I) has a rubber content in the range from 1.5% to 6% by weight, more preferably in the range 1.8% to 5% by weight, yet more preferably in the range 1.9% to 4.1% by weight, most preferably in the range 2.5% to 3.5% by weight.

The aforementioned preferred ranges of components A and B and of component C may be combined with one another as desired.

In a preferred embodiment, the carrier layer (I) consists of a thermoplastic molding compound consisting to an extent of at least 80% by weight, more preferably at least 95% by weight, even more preferably at least 99% by weight and most preferably to an extent of 100% by weight, of components A, B and C.

In the context of the present invention the carrier layer (I) is also referred to as the plastic carrier or the carrier.

The multilayer article is suitable for transillumination with visible light (from 380 to 780 nm) using a light source, i.e. the multilayer article is transilluminable. The light source is arranged such that the light is initially incident on the carrier material (I) and exits through the layer (II) or, especially always when layer (II) is a layer which is impermeable or insufficiently permeable to visible light, through cutouts introduced in the layer (II). The light source is preferably an LED light source.

Transilluminable is to be understood as meaning that switching on the light source alters the visual impression on the side facing away from the light source, i.e. the visible side of the component part or component element in the installed state.

In a preferred embodiment, at least in subregions at its actual local thickness at at least one wavelength in the wavelength range of the spectrum from 380 to 780 nm the multilayer article has a transmittance of at least 10%, more preferably at least 25%, yet more preferably at least 40% and most preferably of at least 45%, wherein the transmittance is determined from the transmission spectrum measured according to the specifications in DIN/ISO 13468-2, 2006 version.

The invention further provides for the use of a molding compound as described above as a carrier layer (I) in a multilayer article as described above.

The invention further provides a lighting or display unit comprising a multilayer article as described above and a light source emitting light having at least one wavelength in the wavelength range of the spectrum from 380 to 780 nm, wherein the light source is arranged such that the carrier layer (I) of the multilayer article is transilluminated by the light emitted by the light source.

The invention further provides a process for producing a transilluminable multilayer article, comprising the steps of a) producing a layer of a material selected from the group consisting of stone, animal hide product, textile fabric containing synthetic fibers, material of vegetable origin or containing constituents of vegetable origin or laminate containing one or more of the recited materials,
wherein the layer at least in subregions at its actual local thickness at at least one wavelength in the wavelength range of the spectrum from 380 to 780 nm has a transmittance of at least 25%, preferably of at least 40% and most preferably of at least 50%, wherein the transmittance is determined from the transmission spectrum measured according to the specifications in DIN/ISO 13468-2, 2006 version
or
wherein the layer has a transmittance of less than 25% in the entire wavelength range of the spectrum from 380 to 780 n, wherein the transmittance is determined from the transmission spectrum measured according to the specifications in DIN/ISO 13468-2, 2006 version, and wherein the layer (II) comprises at least one cutout in the shape of at least one symbol, one pattern, one hole, one line or one character or comprises punctate cutouts arranged in the shape of at least one symbol, one pattern, one hole, one line or one character,
b) optionally thermoforming the layer produced in step a),
c) subjecting the layer to film-insert molding with a thermoplastic molding compound as described above.

Composition of the Carrier Layer (I)

Component A

Aromatic polycarbonates and/or aromatic polyester carbonates of component A which are suitable in accordance with the invention are known from the literature or producible by processes known from the literature (for production of aromatic polycarbonates see, for example, Schnell, "Chemistry and Physics of Polycarbonates", Interscience Publishers, 1964, and also DE-AS 1 495 626, DE-A 2 232 877, DE-A 2 703 376, DE-A 2 714 544, DE-A 3 000 610, DE-A 3 832 396; for production of aromatic polyester carbonates, for example DE-A 3 007 934).

Aromatic polycarbonates are produced for example by reaction of diphenols with carbonyl halides, preferably phosgene and/or with aromatic dicarbonyl dihalides, preferably dihalides of benzenedicarboxylic acid, by the interfacial process, optionally using chain terminators, for example monophenols, and optionally using trifunctional or more than trifunctional branching agents, for example triphenols or tetraphenols. Production via a melt polymerization process by reaction of diphenols with for example diphenyl carbonate is likewise possible.

Diphenols for the production of the aromatic polycarbonates and/or aromatic polyester carbonates are preferably those of formula (I)

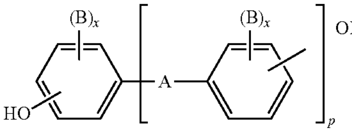

(I)

wherein

A is a single bond, $C_1$ to $C_5$ alkylene, $C_2$ to $C_5$ alkylidene, $C_5$ to $C_6$ cycloalkylidene, —O—, —SO—, —CO—, —S—, —$SO_2$—, $C_6$ to $C_{12}$ arylene, onto which further aromatic rings optionally containing heteroatoms may be fused,
or a radical of formula (II) or (III)

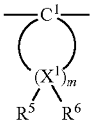

(II)

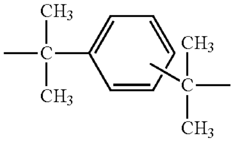

(III)

B is in each case $C_1$ to $C_{12}$ alkyl, preferably methyl, halogen, preferably chlorine and/or bromine,
x is in each case independently 0, 1 or 2,
p is 1 or 0, and $R^5$ and $R^6$ may be selected individually for each $X^1$ and are each independently hydrogen or $C_1$ to $C_6$ alkyl, preferably hydrogen, methyl or ethyl, $X^1$ is carbon and m is an integer from 4 to 7, preferably 4 or 5, with the proviso that, on at least one atom $X^1$, $R^5$ and $R^6$ are both alkyl.

Preferred diphenols are hydroquinone, resorcinol, dihydroxydiphenols, bis(hydroxyphenyl)-$C_1$-$C_5$-alkanes, bis(hydroxyphenyl)-$C_5$-$C_6$-cycloalkanes, bis(hydroxyphenyl) ethers, bis(hydroxyphenyl) sulfoxides, bis(hydroxyphenyl) ketones, bis(hydroxyphenyl) sulfones and $\alpha,\alpha$-bis(hydroxyphenyl)diisopropylbenzenes and also ring-brominated and/or ring-chlorinated derivatives thereof.

Particularly preferred diphenols are 4,4'-dihydroxybiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulfide, 4,4'-dihydroxydiphenyl sulfone, and also the di- and tetrabrominated or chlorinated derivatives thereof, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. Particular preference is given to 2,2-bis(4-hydroxyphenyl) propane (bisphenol A).

The diphenols may be used individually or in the form of any desired mixtures. The diphenols are known from the literature or obtainable by processes known from the literature.

Examples of chain terminators suitable for the production of the thermoplastic aromatic polycarbonates include phenol, p-chlorophenol, p-tert-butylphenol or 2,4,6-tribromophenol, but also long-chain alkylphenols, such as 4-[2-(2,4,4-trimethylpentyl)]phenol, 4-(1,3-tetramethylbutyl)phenol according to DE-A 2 842 005 or monoalkylphenol or dialkylphenols having a total of 8 to 20 carbon atoms in the alkyl substituents, such as 3,5-di-tert-butylphenol, p-isooctylphenol, p-tert-octylphenol, p-dodecylphenol and 2-(3,5-dimethylheptyl)phenol and 4-(3,5-dimethylheptyl)phenol. The amount of chain terminators to be used is generally between 0.5 mol % and 10 mol % based on the molar sum of the diphenols used in each case.

The thermoplastic, aromatic polycarbonates have average molecular weights (weight average $M_W$) of preferably 20 000 to 40 000 g/mol, more preferably of 24 000 to 32 000 g/mol, particularly preferably 26 000 to 30 000 g/mol, measured by GPC (gel permeation chromatography) calibrated against bisphenol A polycarbonate standards using dichloromethane as eluent, calibration with linear polycarbonates (made of bisphenol A and phosgene) of known molar mass distribution from PSS Polymer Standards Service GmbH, Germany, and calibration according to method 2301-0257502-09D (2009 edition in German language) from Currenta GmbH & Co. OHG, Leverkusen. The eluent is dichloromethane. Column combination of crosslinked styrene-divinylbenzene resins. Diameter of analytical columns: 7.5 mm; length: 300 mm. Particle sizes of column material: 3 μm to 20 μm. Concentration of solutions: 0.2% by weight. Flow rate: 1.0 ml/min, temperature of solutions: 30° C. Use of UV and/or RI detection.

The preferred ranges result in a particularly advantageous balance of mechanical and rheological properties in the compositions of the invention.

The thermoplastic aromatic polycarbonates may be branched in a known manner, and preferably through incorporation of 0.05 to 2.0 mol %, based on the sum total of the diphenols used, of trifunctional or more than trifunctional compounds, for example those having three or more phenolic groups. Preference is given to using linear polycarbonates, more preferably ones based on bisphenol A.

Both homopolycarbonates and copolycarbonates are suitable. Copolycarbonates according to the invention according to component A may also be produced using 1% to 25% by weight, preferably 2.5% to 25% by weight, based on the total amount of diphenols to be used, of polydiorganosiloxanes having hydroxyaryloxy end groups. These are known (U.S. Pat. No. 3,419,634) and can be produced by processes known from the literature. Polydiorganosiloxane-containing copolycarbonates are likewise suitable; production of the polydiorganosiloxane-containing copolycarbonates is described, for example, in DE-A 3 334 782.

Aromatic dicarbonyl dihalides for the production of aromatic polyester carbonates are preferably the diacyl dichlorides of isophthalic acid, of terephthalic acid, of diphenyl ether 4,4'-dicarboxylic acid and of naphthalene-2,6-dicarboxylic acid.

Particular preference is given to mixtures of the diacyl dichlorides of isophthalic acid and terephthalic acid in a ratio of between 1:20 and 20:1.

In the production of polyester carbonates, a carbonyl halide, preferably phosgene, is also additionally used as a bifunctional acid derivative.

Useful chain terminators for the production of the aromatic polyester carbonates include, aside from the monophenols already mentioned, the chlorocarbonic esters thereof and the acyl chlorides of aromatic monocarboxylic acids, which may optionally be substituted by $C_1$- to $C_{22}$-alkyl groups or by halogen atoms, and aliphatic $C_2$- to $C_{22}$-monocarbonyl chlorides.

The amount of chain terminators is in each case 0.1 to 10 mol %, based on moles of diphenol in the case of the phenolic chain terminators and on moles of dicarbonyl dichloride in the case of monocarbonyl chloride chain terminators.

In the production of aromatic polyester carbonates it is also possible to use one or more aromatic hydroxycarboxylic acids.

The aromatic polyester carbonates may be linear or they may be branched in a known manner (see DE-A 2 940 024 and DE-A 3 007 934), preference being given to linear polyester carbonates.

Branching agents used may for example be tri- or polyfunctional carboxylic acid chlorides, such as trimesyl trichloride, cyanuric trichloride, 3,3',4,4'-benzophenonetetracarboxylic acid tetrachloride, 1,4,5,8-naphthalenetetracarboxylic acid tetrachloride or pyromellitic tetrachloride, in amounts of 0.01 to 1.0 mol % (based on dicarboxylic acid dichlorides used), or tri- or polyfunctional phenols, such as phloroglucinol, 4,6-dimethyl-2,4,6-tri(4-hydroxyphenyl) hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxyphenyl) propane, tetra(4-[4-hydroxyphenylisopropyl]phenoxy)-methane, 1,4-bis[4,4'-dihydroxytriphenyl)methyl]benzene, in amounts of 0.01 to 1.0 mol %, based on diphenols used. Phenolic branching agents may be initially charged together with the diphenols; acid chloride branching agents may be introduced together with the acid dichlorides.

The proportion of carbonate structural units in the thermoplastic aromatic polyester carbonates may be varied as desired. Preferably, the proportion of carbonate groups is up to 100 mol %, especially up to 80 mol %, more preferably up to 50 mol %, based on the sum total of ester groups and carbonate groups. Both the ester fraction and the carbonate fraction of the aromatic polyester carbonates may be present in the form of blocks or in random distribution in the polycondensate.

The thermoplastic aromatic polycarbonates and polyester carbonates may be used alone or in any desired mixture.

It is preferable to employ linear polycarbonate based on exclusively bisphenol A as component A.

Component B

Component B is selected from rubber-modified vinyl (co)polymers of

- B.1) 80% to 95% by weight, preferably 83% to 93% by weight, more preferably 85% to 92% by weight, based on the rubber-modified vinyl (co)polymer B, of structural units derived from at least one vinyl monomer and
- B.2) 5% to 20% by weight, preferably 7% to 17% by weight, more preferably 8% to 15% by weight, based on the rubber-modified vinyl (co)polymer B, of one or more elastomeric graft substrates having glass transition temperatures $T_g$<−50° C., preferably of <−60° C., particularly preferably <−70° C., containing at least 50% by weight, preferably at least 70% by weight, particularly preferably 100% by weight, based on B.2, of structural units derived from 1,3-butadiene, wherein the rubber-modified vinyl (co)polymer B contains

- (i) a disperse phase consisting of
    - (i.1) rubber particles grafted with vinyl (co)polymer composed of structural units of B.1 and
    - (i.2) vinyl (co)polymer likewise composed of structural units of B.1 enclosed in the rubber particles as a separate disperse phase and
  - (ii) a rubber-free vinyl (co)polymer matrix consisting of structural units of B.1 which is not bonded to the rubber particles and is not enclosed in these rubber particles, and wherein the disperse phase of (i) has a median diameter D50 measured by ultracentrifugation of 0.7 to 2.0 m, preferably of 0.7 to 1.5 m, in particular of 0.7 to 1.2.

Unless expressly stated otherwise in the present invention the glass transition temperature $T_g$ is determined for all components by dynamic differential scanning calorimetry (DSC) according to DIN EN 61006 (1994 version) at a heating rate of 10 K/min with determination of Tg as the midpoint temperature (tangent method).

The rubber-modified vinyl (co)polymers of component B have a melt volume flow rate (MVR) measured according to ISO 1133 (2012 version) at 220° C. with a piston load of 10 kg of preferably 2 to 20 ml/10 min, particularly preferably 3 to 15 ml/10 min, especially 4 to 8 ml/10 min. If mixtures of two or more rubber-modified vinyl (co)polymers are employed as component B the preferred MVR ranges apply to the average of the MVR of the individual components weighted by the mass fractions of the components in the mixture.

Such rubber-modified vinyl (co)polymers B are produced for example by free-radical polymerization, preferably in a bulk polymerization process, of

- B.1 80% to 95% by weight, preferably 83% to 93% by weight, particularly preferably 85% to 92% by weight, based on the rubber-modified vinyl (co)polymer B, of at least one vinyl monomer in the presence of
- B.2 5% to 20% by weight, preferably 7% to 17% by weight, particularly preferably 8% to 15% by weight, based on the rubber-modified vinyl (co)polymer B, of one or more elastomeric graft substrates having glass transition temperatures <−50° C., preferably <−60° C., particularly preferably <−70° C., and containing at least 50% by weight, preferably at least 70% by weight, particularly preferably 100% by weight, based on B.2, of structural units derived from 1,3-butadiene.

The bulk polymerization reaction preferably used for producing the rubber-modified vinyl (co)polymer B comprises both the polymerization of the vinyl monomers of B.1 and a grafting of the thus formed vinyl (co)polymer onto the elastomeric graft substrate of B.2. Furthermore, in this reaction regime self-organization (phase separation) results in formation of a disperse phase (i) consisting of

- (i.1) rubber particles grafted with vinyl (co)polymer composed of structural units of B.1 and
- (i.2) vinyl (co)polymer likewise composed of structural units of B.1 enclosed in the rubber particles as a separate disperse phase, wherein this rubber-containing phase (i) is in the form of a dispersion in a rubber-free vinyl (co)polymer matrix (ii) not bonded to the rubber particles and not enclosed in these rubber particles and consisting of structural units of B.1.

In contrast to the other vinyl (co)polymer proportions in the component B the rubber-free vinyl (co)polymer (ii) may be dissolved out using suitable solvents such as acetone for example.

The size of the disperse phase (i) in the thus produced rubber-modified vinyl (co)polymers B is adjusted via the conditions of the reaction regime such as temperature and the viscosity of the polymer resulting therefrom and also shear from stirring for example.

The median particle size D50 is the diameter with 50% by weight of the particles above it and 50% by weight below it. Unless expressly stated otherwise in the present invention it is determined for all components by ultracentrifuge measurement (W. Scholtan, H. Lange, Kolloid, Z. und Z. Polymere 250 (1972), 782-796).

The monomers B.1 are preferably mixtures consisting of

- B.1.1 60 to 85 parts by weight, particularly preferably 65 to 80 parts by weight, more preferably 70 to 78 parts by weight, in each case based on the sum of B.1.1 and B.1.2, of styrene and
- B.1.2 15 to 40 parts by weight, particularly preferably 20 to 35 parts by weight, more preferably 22 to 30 parts by weight, in each case based on the sum of B.1.1 and B.1.2, of acrylonitrile and optionally B.1.3 0-10 parts by weight, preferably 0-7 parts by weight, more preferably 0-5 parts by weight, of methyl methacrylate or n-butyl acrylate in each case based on 100 parts by weight as the sum of B.1.1 and B.1.2.

In a further preferred embodiment the monomers B.1 are a mixture of 22 to 26 parts by weight of acrylonitrile and 74 to 78 parts by weight of styrene, which optionally can contain up to 10 parts by weight, particularly preferably up to 5 parts by weight, of n-butyl acrylate or methyl methacrylate, wherein the parts by weight of styrene and acrylonitrile sum to 100 parts by weight.

It is particularly preferable when B.1 is free from B.1.3, wherein the abovementioned preferred ranges apply to B.1.1 and B.1.2.

Preferred graft substrates B.2 are diene rubbers containing butadiene or mixtures of diene rubbers containing butadiene or copolymers of diene rubbers containing butadiene or mixtures thereof with further copolymerizable monomers (for example of B.1.1 and B.1.2).

A particularly preferred graft substrate B.2 is pure polybutadiene rubber. In a further preferred embodiment B.2 is styrene-butadiene block copolymer rubber.

Component B preferably has a polybutadiene content of 5% to 18% by weight, more preferably of 7% to 15% by weight, in particular of 8% to 13% by weight.

Particularly preferred rubber-modified vinyl (co)polymers of component B are bulk-polymerized ABS polymers as described for example in DE-A 2 035 390 (=U.S. Pat. No. 3,644,574) or in DE-A 2 248 242 (=GB-B 1 409 275), or in Ullmanns Enzyklopädie der Technischen Chemie [Ullmann's Encyclopedia of Industrial Chemistry], Vol. 19 (1980), p. 280 ff.

The vinyl (co)polymer (ii) not chemically bonded to the rubber substrate(s) B.2 and not enclosed in the rubber particles may be formed as described above as a consequence of production in the polymerization of the graft polymers B. It is likewise possible for a portion of this vinyl (co)polymer (ii) not chemically bonded to the rubber substrate(s) B.2 and not enclosed in the rubber particles to be formed in the rubber-modified vinyl (co)polymer of component B as a consequence of production in the production thereof in the bulk polymerization process and for another portion to be polymerized separately and added to the component B as a constituent of component B. In component B the proportion of the vinyl (co)polymer (ii), irrespective of origin, measured as the acetone-soluble proportion is preferably at least 50% by weight, particularly preferably at least 60% by weight, more preferably at least 70% by weight, based on component B.

In the rubber-modified vinyl (co)polymers of component B this vinyl (co)polymer (ii) has a weight-average molecular weight $M_w$ of 70 to 250 kg/mol, preferably of 130 to 200 kg/mol, in particular of 150 to 180 kg/mol.

In the context of the present invention the weight-average molecular weight $M_w$ of the vinyl (co)polymer (ii) in component B is measured by gel permeation chromatography (GPC) in tetrahydrofuran against a polystyrene standard.

Component B is preferably free from alkali metal, alkaline earth metal, ammonium or phosphonium salts of saturated fatty acids having 8 to 22 carbon atoms, resin acids, alkyl- and alkylarylsulfonic acids and fatty alcohol sulfates.

Component B preferably contains less than 100 ppm, particularly preferably less than 50 ppm, very particularly preferably less than 20 ppm, of ions of alkali metals and alkaline earth metals.

Rubber-modified vinyl (co)polymers suitable as component B are for example Magnum™ 3404, Magnum™ 3504 and Magnum™ 3904 from Trinseo S. A. (Luxembourg).

Component C

Component C present may optionally be one or more representatives selected from the group consisting of polymer additives and polymeric blend partners.

The polymer additives/polymeric blend partners are preferably selected from the group consisting of lubricants and demolding agents, stabilizers, colorants, compatibilizers, further impact modifiers distinct from component B, further polymeric constituents (for example functional blend partners or graft polymers having a core-shell structure produced in an emulsion polymerization process) distinct from the components A and B, and fillers and reinforcers.

In a preferred embodiment, no fillers or reinforcers are present in component C. It is further preferable when no pigments are present. It is further preferable when no polymeric blend partners are present. It is further preferable when no polymeric components are present. In a particularly preferred embodiment no fillers or reinforcers, pigments or polymeric blend partners are present. It is most preferable when no fillers or reinforcers, pigments or polymeric components are present.

In a preferred embodiment, at least one polymer additive selected from the group consisting of lubricants and demolding agents and stabilizers is employed as component C.

In a preferred embodiment, at least one representative selected from the group consisting of sterically hindered phenols, organic phosphites and organic or inorganic Brønsted acids is employed as a stabilizer.

In a preferred embodiment, fatty acid esters, particularly preferably fatty acid esters of pentaerythritol or glycerol, are used as lubricants and demolding agents.

In a particularly preferred embodiment at least one polymer additive selected from the group consisting of C8-C22 fatty acid esters of pentaerythritol, C8-C22 fatty acid esters of glycerol, tris(2,4-di-tert-butylphenyl)phosphite, 2,6-di-tert-butyl-4-(octadecanoxycarbonylethyl)phenol, tetrakis(2,4-di-t ert-butylphenyl)-4,4-biphenyldiphosphonite, bis(2,4-di-tert-butylphenyl)pentaerythritol diphosphite and triethylene glycol bis[3-(3-tert-butyl-4-hydroxy-5-methylphenyl)propionate] is employed as component C.

In a further embodiment component C contains no rubber-modified vinyl (co)polymer produced by emulsion polymerization.

Production of the Molding Compounds of the Carrier Layer

Thermoplastic molding compounds are produced from the components A, B and C according to the invention.

The thermoplastic molding compounds according to the invention can be produced for example by mixing the respective constituents of the compositions in a known manner and melt-compounding and melt-extruding them at temperatures of preferably 200° C. to 320° C., particularly preferably 240° C. to 300° C., very particularly preferably 260° C. to 290° C., in customary apparatuses such as internal kneaders, extruders and twin-screw extruders for example.

In the context of this application, this process is generally referred to as compounding.

The term "molding compound" is thus to be understood as meaning the product obtained when the constituents of the composition are melt-compounded and melt-extruded.

The mixing of the individual constituents of the compositions may be carried out in a known manner, either successively or simultaneously, either at about 20° C. (room temperature) or at a higher temperature. This means that, for example, some of the constituents may be introduced via the main intake of an extruder and the remaining constituents may be introduced later in the compounding process via a side extruder.

Decorative Layer (II)

The multilayer article contains as layer (II) a layer of stone product, animal hide product, textile fabric containing synthetic fibers, material of vegetable origin or containing constituents of vegetable origin or laminate containing one or more of the recited materials, wherein the layer (II) at least in subregions at its actual local thickness at at least one wavelength in the wavelength range of the spectrum from 380 to 780 nm has a transmittance of at least 25%, preferably of at least 40% and most preferably of at least 50%, wherein the transmittance is determined from the transmission spectrum measured according to the specifications in DIN/ISO 13468-2, 2006 version, or wherein the layer (II) has a transmittance of less than 25% in the entire wavelength range of the spectrum from 380 to 780 nm, wherein the transmittance is determined from the transmission spectrum measured according to the specifications in DIN/ISO 13468-2, 2006 version, and wherein the layer (II) comprises at least one cutout in the shape of at least one symbol, one pattern, one hole, one line or one character or comprises punctate cutouts arranged in the shape of at least one symbol, one pattern, one hole, one line or one character.

In this embodiment, transillumination of the multilayer article from the carrier side causes the shapes represented by the cutouts to become visible on the visible side of the multilayer article.

The material used in layer (II) is temperature-sensitive and/or pressure-sensitive. It is therefore advantageous to employ the lowest possible temperatures or pressures in the production of the multilayer articles by film-insert molding of the layer (II) with the material of the carrier layer (I).

Preferably employed materials of vegetable origin include natural wood, wood veneer, cork, paper, cellulose products or textile fabrics made of natural fibers such as silk, cotton, flax or hemp.

Materials containing constituents of vegetable origin as described above which are suitable for production of the decorative layer according to the present invention contain these constituents of vegetable origin in a proportion of preferably at least 20% by weight, particularly preferably at least 50% by weight, particularly preferably at least 70% by weight.

Brittle materials are prone to fracture in thin layers and are therefore pressure-sensitive. This applies for example to stone products, such as natural stone or other stone-like materials. In the context of the present invention all types of natural stone and stone-like materials are generally referred to as stone or stone product and the corresponding layer as a stone layer.

The stone layer is a layer of a metamorphic rock or a sedimentary rock. These comprise a plurality of relatively discrete layers which may be removed from the natural stone material as thin layers. Suitable stone materials are, for example, clay rocks in slatelike form or slate clay, limestone, sandstone, mudstone, clay shale, quartzite, phyllite, mica shale, chlorite schist, gneiss, tale schist, blue or glaucophane schist, colored slate, prasinite, epidote-amphibolite, amphibolite, embrechite, agmatite, calcareous schist, mylonite, argillite, migmatite, marble, serpentinite, eclogite, schist, fruchtschiefer or granulite. The stone layer preferably comprises colored slate, mica shale, limestone, sandstone or marble; more preferably consists of one of these rocks. In principle, the stone layer may be composed of different stone elements and may constitute, for example, a mosaic of one or more stone types. However, the stone layer preferably consists of one stone type and has been worked in one piece.

Stone-like materials employed include composite materials containing at least 50% by weight, preferably at least 70% by weight, more preferably at least 80% by weight and most preferably at least 90% by weight of mineral constituents/constituents of mineral origin and up to 50% by weight, preferably up to 30% by weight, more preferably up to 20% by weight, particularly preferably up to 10% by weight, of polymeric binders and/or other additive constituents. Such composite materials are produced by compounding or preferably by pressing intimate mixtures of optionally processed rock flour, for example aluminum hydroxide (obtained from bauxite) or quartz flour, and the polymeric binders and/or other additive constituents, preferably at high pressures and/or temperatures. They are often marketed as artificial stone, for example under the trade names Dekton®, Corian®, Himacs® or Silestone®. In the context of the present invention stone-like materials are to be understood as also including ceramics and mineral glasses.

The thickness of the stone layer is ≤2 mm, preferably ≤1 mm, more preferably ≤0.5 mm, particularly preferably ≤0.3 mm, wherein said thickness is averaged over the surface area of the stone layer.

An exemplary suitable animal hide product is leather. This may be a smooth leather or a roughout leather for example from cow, calf, goat or sheep. The leather may be obtained by various tanning processes and may also be subjected to a surface treatment. These measures are known to those skilled in the art.

Wood veneer is to be understood as meaning a thin sheet composed of at least one layer of wood which is separated from a log by peeling, cutting or sawing (DIN 4079). Another option is that of bonding sawn lumber laminate to afford a block in order then to cut said block.

Preferably employed wood veneers have a thickness in the range from 0.1 to 0.5 mm. Very thin veneers are prone to cracking and their processing accordingly requires particular care.

The at least one wood veneer preferably comprises at least one wood layer of any desired wood type. Particular preference is given to a wood veneer from the group of maple, birch, tulipwood, cherry, ash, alder, beech, walnut, oak, plane and mahogany.

The wood layer can be natural or colored. The coloring may be over the whole area or merely a partial area. The wood layer can produce both visual and haptic effects.

In a preferred embodiment the layer (II) is a layer of a material selected from the group consisting of animal hide product, textile fabric containing synthetic fibers, material of vegetable origin or containing constituents of vegetable origin or laminate containing one or more of the recited materials, more preferably a layer of a material selected from the group consisting of textile fabric containing synthetic fibers, material of vegetable origin or containing constituents of vegetable origin or laminate containing one or more of the recited materials, particularly preferably a layer of a material of vegetable origin or a laminate containing a material of vegetable origin, most preferably a layer of natural wood, in particular a natural wood veneer.

The layer (II) may further be treated on the side facing away from the carrier layer by pickling, milling, impregnating, lacquering, application of dyes or other techniques to alter the surface impression or the haptics. The steps may be carried out on the finished multilayer article or on the layer (II) before bonding to the carrier material.

It is alternatively also possible in a first specific embodiment to realize a decorative layer (II) which is transilluminable only in subregions when a layer of stone product, animal hide product, textile fabric containing synthetic fibers, material of vegetable origin or containing constituents of vegetable origin or laminate containing one or more of the recited materials having in its actual thickness at at least one wavelength in the wavelength range of the spectrum from 380 to 780 nm a transmittance of at least 25%, more preferably of at least 40% and most preferably of at least 50%, wherein the transmittance is determined from the transmission spectrum measured according to the specifications in DIN/ISO 13468-2, 2006 version, is coated, for example printed, on its side facing away from the visible side of the multilayer component part, i.e. the side facing the carrier (I) made of the thermoplastic material, with a light-impermeable layer, for example a lacquer, wherein this light-impermeable layer comprises at least one cutout (preferably in shapes as described above). In this first specific embodiment, production of the multilayer article according to the invention comprises subjecting the thus-produced layer (II) on the side provided with the light-impermeable layer to film-insert molding with the thermoplastic molding compound with the result that the appearance of the stone product, animal hide product, textile fabric containing synthetic fibers, material of vegetable origin or containing constituents of vegetable origin or laminate containing one or more of the recited materials is preserved on the visible side of the multilayer article.

In this first specific embodiment, the multilayer article thus contains, in this order, starting from the visible side, the decorative layer (II), the light-impermeable layer (for example a lacquer) having at least one cutout and the carrier layer (I).

In a second specific embodiment, initially the decorative layer (II) (which at at least one wavelength in the wavelength range of the spectrum from 380 to 780 nm has a transmittance of at least 25%, more preferably at least 40% and most preferably of at least 50%, wherein the transmittance is determined from the transmission spectrum measured according to the specifications in DIN/ISO 13468-2, 2006 version) is subjected to film-insert molding with the carrier material to form the carrier layer (I) and subsequently the carrier layer (I) on the side facing away from the decorative layer (II) is coated, for example printed, with a light-impermeable layer, for example a lacquer, wherein this light-impermeable layer comprises at least one cutout.

In this second specific embodiment, the multilayer article thus contains, in this order, starting from the visible side, the decorative layer (II), the carrier layer (I) and the light-impermeable layer (for example a lacquer) having at least one cutout.

The layer (II) may be coated with a coating composition on the side facing away from the carrier layer, i.e. the visible side. A coating is typically intended to provide mechanical protection from abrasion and scratching and/or protection from weathering effects, i.e. precipitation, temperature variation and UV radiation. Specific surface haptics or optics can also be achieved with a coating.

Suitable coatings are for example thermally curable coating systems based on a polysiloxane coating which may be either single-layer or multi-layer systems (with a merely adhesion-promoting primer layer between the substrate and the polysiloxane topcoat).

It is also possible to employ UV-curable coating systems, based on acrylate, urethane acrylate or acryloylsilane for example and optionally including fillers for improving scratch resistance.

Production of the Multilayer Articles

The multilayer articles are preferably produced by in-mold decoration (IMD). IMD is a special type of injection molding where before injection of the plastic melt optionally three-dimensionally preformed layers of the material of the decorative layer (II) are inserted into the injection mold as inserts. The process as such is known to those skilled in the art and is widely used.

The inserts are typically films, sheets or other layers that have been subjected to forming. Forming may be effected using mechanical or contactless thermoforming. This employs deep-drawing for example. Other processes are vacuum deep drawing, pressing or blow molding. At tighter positional tolerances the known high pressure forming (HPF) process, as described for example in EP 2 197 656 B1, is used. The films are generally trimmed after forming. This may employ common processes such as stamping, milling, knife cutting, laser cutting and water jet cutting.

Put simply, in a preferred process production of the multilayer articles according to the invention thus preferably comprises the steps of:

a) producing a layer of a material selected from the group consisting of stone, animal hide product, textile fabric containing synthetic fibers, material of vegetable origin or containing constituents of vegetable origin or laminate containing one or more of the recited materials, wherein the layer (II) at least in subregions at its actual local thickness at at least one wavelength in the wavelength range of the spectrum from 380 to 780 nm has a transmittance of at least 25%, preferably of at least 40% and most preferably of at least 50%, wherein the transmittance is determined from the transmission spectrum measured according to the specifications in DIN/ISO 13468-2, 2006 version, or wherein the layer (II) has a transmittance of less than 25% in the entire wavelength range of the spectrum from 380 to 780 nm, wherein the transmittance is determined from the transmission spectrum measured according to the specifications in DIN/ISO 13468-2, 2006 version, and wherein the layer (II) comprises at least one cutout in the shape of at least one symbol, one pattern, one hole, one line or one character or comprises punctate cutouts arranged in the shape of at least one symbol, one pattern, one hole, one line or one character, b) optionally thermoforming the layer produced in step a), c) subjecting the layer to film-insert molding with a thermoplastic molding compound as described above.

It is also possible for the three-dimensional forming of the layer and the film-insert molding to be carried out in a single injection mold. Such a simplified process is described for example in WO 2014/044694 A1.

It is also possible that after subjection of the decorative layer (II) to film-insert molding with the carrier material a further layer of a thermoplastic material, preferably a transparent material, is applied in an overmolding process, so that this further layer seamlessly envelops the surface of the component part obtained after the film-insert molding. Overmolding is known to those skilled in the art and is described for example in the published specifications WO 2012/069590 A1, EP2402140 A1 and DE 102007011338 A1.

The carrier layer (I) preferably has a thickness of 0.5 mm to 5 mm, particularly preferably of 1.5 mm to 3.5 mm, particularly preferably of 1.7 mm to 3.0 mm. This is to be understood as meaning that the carrier layer (I) has a thickness in these ranges at any point of its extent, wherein in the regions to be transilluminated it is preferable to employ carrier layer thicknesses of at most 3.0 mm, more preferably at most 2.5 mm, particularly preferably at most 2.2 mm. The layer need not necessarily have the same thickness over the entire area but rather may also have different thicknesses, for example due to the configuration of reinforcing ribs, due to the component part shape or due to mounting structures etc.

Further embodiments of the present invention are described below:

1. Multilayer article comprising (I) a carrier layer composed of a thermoplastic molding compound containing A) at least one representative selected from the group consisting of aromatic polycarbonate and aromatic polyester carbonate, B) rubber-modified vinyl (co)polymer composed of B.1) 80% to 95% by weight, based on the rubber-modified vinyl (co)polymer B, of structural units derived from at least one vinyl monomer and B.2) 5% to 20% by weight, based on the rubber-modified vinyl (co)polymer B, of one or more elastomeric graft substrates having glass transition temperatures <−50° C. and containing at least 50% by weight, based on B.2, of structural units derived from 1,3-butadiene, wherein the rubber-modified vinyl (co)polymer B contains (i) a disperse phase consisting of (i.1) rubber particles grafted with vinyl (co) polymer composed of structural units of B.1 and (i.2) vinyl (co)polymer likewise composed of structural units of B.1 enclosed in the rubber particles as a separate disperse phase and (ii) a rubber-free vinyl (co)polymer matrix consisting of structural units of B.1 which is not bonded to the rubber particles and is not enclosed in these rubber particles, wherein the disperse phase of (i) has a median diameter D50 measured by ultracentrifugation of 0.7 to 2.0 μm, C) optionally at least one further component selected from polymer additives and polymeric blend partners, wherein the thermoplastic molding compound contains less than 2% by weight of rubber-based graft polymers distinct from component B) and wherein the thermoplastic molding compound has a rubber content of at least 1.5% by weight, and (II) a layer of a material selected from the group consisting of stone product, animal hide product, textile fabric containing synthetic fibers, material of vegetable origin or containing constituents of vegetable origin or laminate containing one or more of the recited materials, wherein the layer (II) at least in subregions at its actual local thickness at at least one wavelength in the wavelength range of the spectrum from 380 to 780 nm has a transmittance of at least 25%, wherein the transmittance is determined from the transmission spectrum measured according to the specifications in DIN/ISO 13468-2, 2006 version, or wherein the layer (II) has a transmittance of less than 25% in the entire wavelength range of the spectrum from 380 to 780 nm, wherein the transmittance is determined from the transmission spectrum measured according to the specifications in DIN/ISO 13468-2, 2006 version, and wherein the layer (II) comprises at least one cutout in the shape of at least one symbol, one pattern, one hole, one line or one character or comprises punctate cutouts arranged in the shape of at least one symbol, one pattern, one hole, one line or one character.

2. Multilayer article according to embodiment 1, wherein the material of vegetable origin is a natural wood, wood veneer, cork, paper, cellulose product or textile fabric made of natural fibers.

3. Multilayer article according to embodiment 1 or 2, wherein the animal hide product is a leather.

4. Multilayer article according to any one of the preceding embodiments, wherein layer (II) comprises a natural wood or a laminate containing a natural wood.

5. Multilayer article according to any of the preceding embodiments, wherein the layer (II) at least in subregions at its actual local thickness at at least one wavelength in the wavelength range of the spectrum from 380 to 780 nm has a transmittance of at least 40%, preferably of at least 50%, wherein the transmittance is determined from the transmission spectrum measured according to the specifications in DIN/ISO 13468-2, 2006 version.

6. Multilayer article according to any of the preceding embodiments, wherein the thickness of the carrier layer is in the range from 0.5 to 5 mm.

7. Multilayer article according to any of the preceding embodiments, wherein the carrier layer contains 30% to 85% by weight of component A, 14% to 69% by weight of component B, and 0.05% to 20% by weight of component C.

8. Multilayer article according to any of the preceding embodiments, wherein the carrier layer contains 50% to 82% by weight of component A, 17% to 49% by weight of component B and 0.1% to 10% by weight of component C.

9. Multilayer article according to any of the preceding embodiments, wherein the carrier layer contains 58% to 82% by weight of component A, 17% to 41% by weight of component B and 0.2% to 5% by weight of component C.

10. Multilayer article according to any of the preceding embodiments, wherein the carrier layer contains 65% to 75% by weight of component A, 24% to 34% by weight of component B and 0.3% to 2% by weight of component C.

11. Multilayer article according to any of the preceding embodiments, wherein the carrier layer contains less than 1% by weight of rubber-based graft polymers distinct from component B).

12. Multilayer article according to any of the preceding embodiments, wherein the carrier layer contains less than 0.5% by weight of rubber-based graft polymers distinct from component B).

13. Multilayer article according to any of the preceding embodiments, wherein the carrier layer contains no rubber-based graft polymers distinct from component B).

14. Multilayer article according to any of the preceding embodiments, wherein the carrier layer has a rubber content in the range from 1.5% to 6% by weight.

15. Multilayer article according to any of the preceding embodiments, wherein the carrier layer has a rubber content in the range from 1.8% to 5% by weight.

16. Multilayer article according to any of the preceding embodiments, wherein the carrier layer has a rubber content of 1.9% to 4.1% by weight.

17. Multilayer article according to any of the preceding embodiments, wherein the carrier layer has a rubber content in the range from 2.5% to 3.5% by weight.

18. Multilayer article according to any of the preceding embodiments, wherein component A of the carrier layer is an aromatic polycarbonate exclusively based on bisphenol A.

19. Multilayer article according to any of the preceding embodiments, wherein component B of the carrier layer is produced by a bulk polymerization process.

20. Multilayer article according to any of the preceding embodiments, wherein component B) contains less than a sum total of 20 ppm of ions of alkali metals and alkaline earth metals.

21. Multilayer article according to any of the preceding embodiments, wherein the carrier layer consists of the components A, B and C.

22. Use of a thermoplastic molding compound containing

A) at least one representative selected from the group consisting of aromatic polycarbonate and aromatic polyester carbonate, B) rubber-modified vinyl (co)polymer composed of B.1) 80% to 95% by weight, based on the rubber-modified vinyl (co)polymer B, of structural units derived from at least one vinyl monomer and B.2) 5% to 20% by weight, based on the rubber-modified vinyl (co)polymer B, of one or more elastomeric graft substrates having glass transition temperatures <−50° C. and containing at least 50% by weight, based on B.2, of structural units derived from 1,3-butadiene, wherein the rubber-modified vinyl (co)polymer B contains (i) a disperse phase consisting of (i.1) rubber particles grafted with vinyl (co)polymer composed of structural units of B.1 and (i.2) vinyl (co)polymer likewise composed of structural units of B.1 enclosed in the rubber particles as a separate disperse phase and (ii) a rubber-free vinyl (co)polymer matrix consisting of structural units of B.1 which is not bonded to the rubber particles and is not enclosed in these rubber particles, wherein the disperse phase of (i) has a median diameter D50 measured by ultracentrifugation of 0.7 to 2.0 μm, C) optionally at least one further component selected from polymer additives and polymeric blend partners, wherein the thermoplastic molding compound contains less than 2% by weight of rubber-based graft polymers distinct from component B) and wherein the thermoplastic molding compound has a rubber content of at least 1.5% by weight, as a carrier layer in a multilayer article, wherein the multilayer article comprises the following components:

(I) the carrier layer, (II) a layer of a material selected from the group consisting of stone product, animal hide product, textile fabric containing synthetic fibers, material of vegetable origin or containing constituents of vegetable origin or laminate containing one or more of the recited materials, wherein the layer (II) at least in subregions at its actual local thickness at at least one wavelength in the wavelength range of the spectrum from 380 to 780 nm has a transmittance of at least 25%, wherein the transmittance is determined from the transmission spectrum measured according to the specifications in DIN/ISO 13468-2, 2006 version, or wherein the layer (II) has a transmittance of less than 25% in the entire wavelength range of the spectrum from 380 to 780 nm, wherein the transmittance is determined from the transmission spectrum measured according to the specifications in DIN/ISO 13468-2, 2006 version, and wherein the layer (II) comprises at least one cutout in the shape of at least one symbol, one pattern, one hole, one line or one character or comprises punctate cutouts arranged in the shape of at least one symbol, one pattern, one hole, one line or one character.

23. Process for producing a multilayer article comprising the steps of a) producing a layer (II) of a material selected from the group consisting of group consisting of stone, animal hide product, textile fabric containing synthetic fibers, material of vegetable origin or containing constituents of vegetable origin or laminate containing one or more of the recited materials, wherein the layer (II) at least in subregions at its actual local thickness at at least one wavelength in the wavelength range of the spectrum from 380 to 780 nm has a transmittance of at least 25%, wherein the transmittance is determined from the transmission spectrum measured according to the specifications in DIN/ISO 13468-2, 2006 version, or wherein the layer (II) has a transmittance of less than 25% in the entire wavelength range of the spectrum from 380 to 780 nm, wherein the transmittance is determined from the transmission spectrum measured according to the specifications in DIN/ISO 13468-2, 2006 version, and wherein the layer (II) comprises at least one cutout in the shape of at least one symbol, one pattern, one hole, one line or one character or comprises punctate cutouts arranged in the shape of at least one symbol, one pattern, one hole, one line or one character, b) optionally thermoforming the layer produced in step a), c) subjecting the layer to film-insert molding with a thermoplastic molding compound containing A) at least one representative selected from the group consisting of aromatic polycarbonate and aromatic polyester carbonate, B) rubber-modified vinyl (co)polymer composed of B.1) 80% to 95% by weight, based on the rubber-modified vinyl (co)polymer B, of structural units derived from at least one vinyl monomer and B.2) 5% to 20% by weight, based on the rubber-modified vinyl (co)polymer B, of one or more elastomeric graft substrates having glass transition temperatures <−50° C. and containing at least 50% by weight, based on B.2, of structural units derived from 1,3-butadiene, wherein the rubber-modified vinyl (co)polymer B contains (i) a disperse phase consisting of (i.1) rubber particles grafted with vinyl (co)polymer composed of structural units of B.1 and (i.2) vinyl (co)polymer likewise composed of structural units of B.1 enclosed in the rubber particles as a separate disperse phase and (ii) a rubber-free vinyl (co)polymer matrix consisting of structural units of B.1 which is not bonded to the rubber particles and is not enclosed in these rubber particles, wherein the disperse phase of (i) has a median diameter D50 measured by ultracentrifugation of 0.7 to 2.0 μm, C) optionally at least one further component selected from polymer additives and polymeric blend partners, wherein the thermoplastic molding compound contains less than 2% by weight of rubber-based graft polymers distinct from component B) and wherein the thermoplastic molding compound has a rubber content of at least 1.5% by weight.

24. Lighting or display unit comprising a) a multilayer article according to any of embodiments 1 to 21 b) a light source emitting light having at least one wavelength in the wavelength range of the spectrum from 380 to 780 nm, wherein the light source b) is arranged such that the carrier layer (I) of the multilayer article a) is transilluminated by the light emitted by the light source b).

25. Lighting or display unit according to embodiment 24, wherein the light source b) is an LED light source.

Examples

Component A-1:

Linear polycarbonate based on bisphenol A having a weight-average molecular weight $M_w$ of 24 000 g/mol (determined by GPC at room temperature in methylene chloride against a BPA-PC standard).

Component A-2:

Linear polycarbonate based on bisphenol A having a weight-average molecular weight $M_w$ of 28 000 g/mol (determined by GPC at room temperature in methylene chloride against a BPA-PC standard).

Component B-1:

Acrylonitrile-butadiene-styrene (ABS) polymer produced in a bulk polymerization process which contains a disperse phase composed of styrene-acrylonitrile copolymer-grafted rubber particles based on a polybutadiene rubber as the graft substrate and containing enclosed styrene-acrylonitrile copolymer as a separate disperse phase and a styrene-acrylonitrile copolymer matrix which is not chemically bonded to the rubber particles and not enclosed in the rubber particles. Component B-1 has an A:B:S ratio of 23:10:67% by weight and a gel content, determined as the proportion insoluble in acetone, of 20% by weight. The acetone-soluble proportion of component B-1 has a weight-average molecular weight $M_w$ (measured by GPC in tetrahydrofuran as the solvent using a polystyrene standard) of 165 kg/mol. The median particle size of the disperse phase D50, measured by ultracentrifugation, is 0.85 μm. The melt flow rate (MVR) of component B-1, measured according to ISO 1133 (2012 version) at 220° C. with a piston load of 10 kg, is 6.7 ml/10 min.

Component B-2:

Acrylonitrile-butadiene-styrene-n-butyl acrylate (ABSBA) polymer produced in a bulk polymerization process which contains a disperse phase composed of styrene-acrylonitrile-n-butyl acrylate terpolymer-grafted rubber particles based on a polybutadiene rubber as the graft substrate and containing enclosed styrene-acrylonitrile-n-butyl acrylate terpolymer as a separate disperse phase and a styrene-acrylonitrile copolymer matrix which is not chemically bonded to the rubber particles and not enclosed in the rubber particles. Component B-2 has an A:B:S:BA ratio of 22.5:10:63:4.5% by weight and a gel content, determined as the proportion insoluble in acetone, of 19% by weight. The acetone-soluble proportion of component B-2 has a weight-average molecular weight $M_w$ (measured by GPC in tetrahydrofuran as the solvent using a polystyrene standard) of 115 kg/mol. The median particle size of the disperse phase D50, measured by ultracentrifugation, is 0.50 μm. The melt flow rate (MFR) of component C-1, measured according to ISO 1133 (2012 version) at 220° C. with a piston load of 10 kg, is 28 g/10 min.

Component B-3

Acrylonitrile-butadiene-styrene graft polymer having a core-shell structure produced by emulsion polymerization of 43% by weight, based on the ABS polymer, of a mixture of 27% by weight of acrylonitrile and 73% by weight of styrene in the presence of 57% by weight, based on the ABS polymer, of a particulate-crosslinked polybutadiene rubber as the graft substrate. This polybutadiene rubber graft substrate has a bimodal particle size distribution having maxima at 0.28 μm and 0.40 μm and a median particle size D50, measured by ultracentrifugation, of 0.35 μm.

Component B-3 contains no styrene-acrylonitrile copolymer enclosed in the rubber particles.

Component B-4

Acrylonitrile-butadiene-styrene graft polymer having a core-shell structure produced by emulsion polymerization of 42% by weight, based on the ABS polymer, of a mixture of 26% by weight of acrylonitrile and 74% by weight of styrene in the presence of 58% by weight, based on the ABS polymer, of an agglomerated particulate polybutadiene rubber as the graft substrate. Compared to the graft substrate used in component B-3, this polybutadiene rubber graft substrate has a significantly broader and monomodal particle size distribution. However, the median particle size D50, measured by ultracentrifugation, of 0.38 μm is in a similar range to that of component B-3. Component B-4 contains no styrene-acrylonitrile copolymer enclosed in the rubber particles.

Component B-5

Styrene-acrylonitrile copolymer produced in a bulk polymerization process having an acrylonitrile content of 23% by weight and having a weight-average molecular weight $M_w$ of 100 000 Da measured by GPC at room temperature in tetrahydrofuran with a polystyrene standard.

Component C1:

Pentaerythritol tetrastearate

Component C-2:

Irganox™ B900 (BASF, Ludwigshafen, Germany)

Mixture of 80% by weight of tris(2,4-di-tert-butyl-phenyl) phosphite (Irgafos™ 168) and 20% by weight of 2,6-di-tert-butyl-4-(octadecanoxycarbonylethyl)phenol (Irganox™ 1076)

Component C3:

Irganox™ 1076 (BASF, Ludwigshafen, Germany)

2,6-di-tert-butyl-4-(octadecanoxycarbonylethyl)phenol

Production and Testing of the Molding Compounds According to the Invention

Production of the molding compounds was carried out in a ZSK25 twin-screw extruder from Coperion, Werner & Pfleiderer (Stuttgart, Germany) at a melt temperature of 260° C. and with application of a reduced pressure of 100 mbar (absolute).

The test specimens were produced at a melt temperature of 260° C. and a mold temperature of 80° C. in an Arburg 270 E injection molding machine.

Melt viscosity was determined at a temperature of 260° C. and a shear rate of 1000 $s^{-1}$ according to ISO 11443 (2014 version).

The IZOD notched impact strength was determined at temperatures in the range from −50° C. to 23° C. on test bars having dimensions of 80 mm×10 mm×4 mm according to ISO 180/1A (2013 version).

The measurements at different temperatures were used to determine the ductile-brittle transition temperature as the temperature at which 50% of the test specimens in the test undergo brittle breakage and 50% undergo ductile breakage.

To determine material ductility under multiaxial stress at low temperatures a puncture test according to ISO 6603-2 (2002 version) was performed at −20° C. on in each case ten test specimens having dimensions of 60 mm×60 mm×2 mm. The percentage of brittle fractures serves as a measure of the material ductility under multiaxial stress. A brittle fracture is to be understood as meaning a fracture failure in which parts of the test specimen splinter out during the puncture test and/or the test specimens show unstable crack propagation causing the test specimen to break completely in two along such a crack in the test.

transillumination of a test specimen having dimensions of 60 mm×40 mm×2 mm (i.e. having a material thickness of 2 mm) as a function of the polar angle measured relative to the incident light beam in the range from 0° to 90°. The obtained values are normalized to the intensity value measured at an angle of 0°, so that the normalized intensity varies between 0 and 1 as a function of the polar angle θ, where I(0°)=1. The half power angle (HPA) is defined as the angle at which the normalized intensity has dropped to 0.5, i.e. I(HPA)=0.5. According to this definition the theoretical maximum possible half power angle is 60°.

TABLE 1

Compositions and properties thereof

| | 1 | V2 | V3 | V4 | V5 | V6 | 7 | 8 | V9 | 10 | 11 | 12 | V13 |
|---|---|---|---|---|---|---|---|---|---|---|---|---|---|
| Component | | | | | | | | | | | | | |
| A-1 | 80 | 80 | 80 | 80 | 80 | 80 | 60 | 70 | 90 | | | | |
| A-2 | | | | | | | | | | 60 | 70 | 80 | 90 |
| B-1 | 20 | | | | | | 40 | 30 | 10 | 40 | 30 | 20 | 10 |
| B-2 | | 20 | | | | | | | | | | | |
| B-3 | | | 5 | 2.5 | | | | | | | | | |
| B-4 | | | | | 5 | 2.5 | | | | | | | |
| B-5 | | | 15 | 17.5 | 15 | 17.5 | | | | | | | |
| C-1 | 0.5 | 0.5 | 0.5 | 0.5 | 0.5 | 0.5 | 0.5 | 0.5 | 0.5 | 0.5 | 0.5 | 0.5 | 0.5 |
| C-2 | 0.1 | 0.1 | 0.1 | 0.1 | 0.1 | 0.1 | 0.1 | 0.1 | 0.1 | 0.1 | 0.1 | 0.1 | 0.1 |
| C-3 | 0.2 | 0.2 | 0.2 | 0.2 | 0.2 | 0.2 | 0.2 | 0.2 | 0.2 | 0.2 | 0.2 | 0.2 | 0.2 |
| Calculated parameter | | | | | | | | | | | | | |
| Rubber content in composition [% by wt.] | 2.0 | 2.0 | 2.8 | 1.4 | 2.9 | 1.4 | 4.0 | 3.0 | 1.0 | 4.0 | 3.0 | 2.0 | 1.0 |
| Properties | | | | | | | | | | | | | |
| Transmittance [%] | 52 | 46 | 46 | 51 | 44 | 49 | 47 | 49 | 60 | 46 | 48 | 52 | 58 |
| Half power angle [°] | 50 | 24 | 3 | 2 | 34 | 2 | 57 | 55 | 2 | 56 | 55 | 50 | 2 |
| Melt viscosity [Pas] | 248 | 200 | 228 | 213 | 228 | 225 | 174 | 202 | 312 | 204 | 230 | 293 | 454 |
| Notched impact strength at −30° C. [kJ/m$^2$] | 21 | 16 | 15 | 10 | 15 | 9 | 20 | 24 | 13 | 43 | 43 | 27 | 13 |
| Ductile-brittle transition temperature [° C.] | 0 | 10 | 15 | >23 | 15 | >23 | −15 | −25 | >23 | −45 | −35 | −25 | >23 |
| Puncture test [% brittle fracture] | 70 | 100 | 100 | 100 | 70 | 70 | 90 | 50 | 20 | 0 | 0 | 80 | 80 |
| Modulus of elasticity | 2325 | 2426 | 2432 | 2529 | 2410 | 2524 | 2289 | 2307 | 2341 | 2273 | 2310 | 2348 | 2356 |
| Elongation at break | 60 | 101 | 54 | 57 | 59 | 52 | 62 | 59 | 53 | 53 | 85 | 94 | 86 |
| Vicat B120 | 135 | 134 | 135 | 134 | 135 | 134 | 124 | 131 | 138 | 123 | 131 | 136 | 138 |

Modulus of elasticity E and elongation at break were determined on dumbbells having dimensions of 170 mm×10 mm×4 mm at 23° C. according to ISO 527 (1996 version) at a strain rate of 1 mm/min (modulus of elasticity) or 5 mm/min (elongation at break).

As a measure of heat distortion resistance, the Vicat B/120 softening temperature is determined on test bars having dimensions of 80 mm×10 mm×4 mm according to ISO 180/1A (2014 version).

As a measure of transilluminability the total transmittance was determined according to ISO 13468-2 (2006 version) (light source: D65, observer: 10°) on test specimens having dimensions of 60 mm×40 mm×2 mm (i.e. at a material thickness of 2 mm).

The half power angle (HPA) of the light intensity was used as a measure for light diffusivity. Greater half power angles mean stronger light scattering. The half power angle is determined by measuring the intensity of the light after The data in table 1 show that the inventive molding compounds which contain as component B the inventive component B-1 and are in the inventive range in terms of the polybutadiene rubber content exhibit a surprisingly advantageous combination of high light transmittance and high light diffusivity (scattering power). The inventive molding compounds moreover exhibit an advantageous combination of improved melt flowability (reduced melt viscosity) and good mechanical properties, in particular a good material toughness even at low temperatures. By contrast, the noninventive molding compounds containing the noninventive emulsion-polymerized ABS components B-3 or B-4 or a noninventive bulk-polymerized ABS component B-2 as component B fail to meet this technical object of the invention. The same applies to the molding compounds composed of compositions V9 and V13 which are outside the inventive range in terms of their content of polybutadiene rubber.

Production and Assessment of Multilayer Articles

Multilayer Article 1 (Comparative)

Production of the carrier (I) employed Makrolon® Ai from Covestro Deutschland AG (Leverkusen, Germany). This is an aromatic polycarbonate based on bisphenol A with an MVR of 19 $cm^3$/(10 min), determined at 300° C. and 1.2 kg piston load according to DIN ISO 1133:2012-03, containing UV absorber and demolding agent. Prior to injection molding the Makrolon® was dried in dry air for 4 hours at 120° C.

The employed decorative layers (II) were wood veneers from Microwood® (Liedekerke, Belgium) having a thickness of about 0.1 mm, which were pre-cut to the shape of the multilayer article according to FIG. 1 and additionally provided with 3 holes at the ends of the part to allow attachment and fixing of the veneers on holding pins in the injection mold. The multilayer article has dimensions of 400 mm×120 mm×4 mm. The circular region in the left-hand side of the multilayer article according to FIG. 1 is the gate region of the carrier layer (I) produced in the injection molding. A pin gate with heated channels was used.

A KM GX400 injection molding machine from Krauss-Maffei Group GmbH (Munich, Germany) was then used to produce the bilayered multilayer article from wood veneer as decorative layer (II) and a carrier (I) made of the aforementioned Makrolon®.

This was done by securing a respective wood veneer on the holding pin in the first mold half of a steel mold in a first step. After closure of the mold the transparent Makrolon® melted at 300° C. was injected into the mold onto the wood veneer at a maximum specific injection pressure of about 1500 bar. The temperature of the mold wall was 90° C. both on the ejector side and on the opposite injection side. The injection time was 4 seconds. After a holding time of 15 seconds (specific holding pressure: 700 bar) and a cooling time of 40 seconds the mold was opened and the molding was removed. The recited injection molding conditions were optimized to ensure that it was possible to achieve complete filling of the injection mold and the best possible appearance of the produced multilayer article.

Multilayer Article 2 (Inventive Example)

To produce the carrier (I) the molding compound having the composition of example 11 in table 1 was selected. Prior to injection molding, the pellets of the PC/ABS molding compound according to the invention were dried in dry air at 105° C. for 4 hours.

In a departure from the comparative example (production of the multilayer article 1) closure of the mold was followed by injection of the PC/ABS molding compound melted at 270° C. into the mold onto the wood veneer at a maximum specific injection pressure of about 1350 bar. The temperature of the mold wall was 80° C. both on the ejector side and on the opposite injection side. The injection time was again 4 seconds. After a holding time of 15 seconds (specific holding pressure: 600 bar) and a cooling time of 40 seconds the mold was opened and the molding was removed. The recited injection molding conditions in this example too were optimized to ensure that it was possible to achieve complete filling of the injection mold and the best possible appearance of the produced multilayer article.

The wood veneer of the multilayer article 1 (comparative example) showed a bubble-shaped detachment (radius about 1 cm) from the carrier material in the region of the pin gate caused by a deformation of the wood veneer due to the locally elevated thermal load. In the case of the multilayer article 2 (inventive example) this unwanted effect did not occur.

Both multilayer articles 1 and 2 proved to be diffusely transilluminable with high light yield using a smartphone LED. However, while a homogeneous, uniformly diffuse transillumination appearance was observable in the case of inventive multilayer article 2, transillumination of multilayer article 1 (comparative) resulted in the intrusive and unwanted appearance of the gate region on the visible side.

The invention claimed is:

1. A multilayer article comprising (I) a carrier layer composed of a thermoplastic molding compound containing A) at least one representative selected from the group consisting of aromatic polycarbonate and aromatic polyester carbonate, B) rubber-modified vinyl (co)polymer composed of B.1) 80% to 95% by weight, based on the rubber-modified vinyl (co)polymer B, of structural units derived from at least one vinyl monomer and B.2) 5% to 20% by weight, based on the rubber-modified vinyl (co)polymer B, of one or more elastomeric graft substrates having glass transition temperatures <−50° C. and containing at least 50% by weight, based on B.2, of structural units derived from 1,3-butadiene, wherein the rubber-modified vinyl (co)polymer B contains (i) a disperse phase consisting of (i.1) rubber particles grafted with vinyl (co) polymer composed of structural units of B.1 and (i.2) vinyl (co)polymer composed of structural units of B.1 enclosed in the rubber particles as a separate disperse phase and (ii) a rubber-free vinyl (co)polymer matrix consisting of structural units of B.1 which is not bonded to the rubber particles and is not enclosed in these rubber particles, wherein the disperse phase of (i) has a median diameter D50 measured by ultracentrifugation of 0.7 to 2.0 μm, C) optionally at least one further component selected from polymer additives and polymeric blend partners, wherein the thermoplastic molding compound contains less than 2% by weight of rubber-based graft polymers distinct from component B) and wherein the thermoplastic molding compound has a rubber content of at least 1.5% by weight, and (II) a layer of a material selected from the group consisting of stone product, animal hide product, textile fabric containing synthetic fibers, material of vegetable origin or containing constituents of vegetable origin or laminate containing one or more of the recited materials, wherein the layer (II) at least in subregions at its actual local thickness at at least one wavelength in the wavelength range of the spectrum from 380 to 780 nm has a transmittance of at least 25%, wherein the transmittance is determined from the transmission spectrum measured according to the specifications in DIN/ISO 13468-2, 2006 version, or wherein the layer (II) has a transmittance of less than 25% in the entire wavelength range of the spectrum from 380 to 780 nm, wherein the transmittance is determined from the transmission spectrum measured according to the specifications in DIN/ISO 13468-2, 2006 version, and wherein the layer (II) comprises at least one cutout in the shape of at least one symbol, one pattern, one hole, one line or one character or comprises punctate cutouts arranged in the shape of at least one symbol, one pattern, one hole, one line or one character.

2. The multilayer article as claimed in claim 1, wherein the material of vegetable origin is a natural wood, cork, paper, cellulose product or textile fabric made of natural fibers.

3. The multilayer article as claimed in claim 1, wherein the animal hide product is a leather.

4. The multilayer article as claimed in claim 1, wherein layer (II) comprises a natural wood or a laminate containing a natural wood.

5. The multilayer article as claimed in claim 1, wherein the thickness of the carrier layer is in the range from 0.5 to 5 mm.

6. The multilayer article as claimed in claim 1, wherein the carrier layer contains 30% to 85% by weight of component A, 14% to 69% by weight of component B, and 0.05% to 20% by weight of component C.

7. The multilayer article as claimed in claim 1, wherein component B) contains less than a sum total of 20 ppm of ions of alkali metals and alkaline earth metals.

8. The multilayer article as claimed in claim 1, wherein the carrier layer is free from rubber-based graft polymers distinct from component B).

9. The multilayer article as claimed in claim 1, wherein the carrier layer has a rubber content of 2.5% to 3.5% by weight.

10. The multilayer article as claimed in claim 1, wherein component B) of the carrier layer is produced by a bulk polymerization process.

11. The multilayer article as claimed in claim 1, wherein the carrier layer consists of the components A, B and C.

12. A lighting or display unit comprising a) a multilayer article as claimed in claim 1 and b) a light source emitting light having at least one wavelength in the wavelength range of the spectrum from 380 to 780 nm, wherein the light source b) is arranged such that the carrier layer (I) of the multilayer article a) is transilluminated by the light emitted by the light source b).

13. The lighting or display unit as claimed in claim 12, wherein the light source b) is an LED light source.

14. A process for producing a multilayer article comprising the steps of a) producing a layer of a material selected from the group consisting of stone, animal hide product, textile fabric containing synthetic fibers, material of vegetable origin or containing constituents of vegetable origin or laminate containing one or more of the recited materials, wherein the layer at least in subregions at its actual local thickness at at least one wavelength in the wavelength range of the spectrum from 380 to 780 nm has a transmittance of at least 25%, wherein the transmittance is determined from the transmission spectrum measured according to the specifications in DIN/ISO 13468-2, 2006 version, or wherein the layer has a transmittance of less than 25% in the entire wavelength range of the spectrum from 380 to 780 nm, wherein the transmittance is determined from the transmission spectrum measured according to the specifications in DIN/ISO 13468-2, 2006 version, and wherein the layer (II) comprises at least one cutout in the shape of at least one symbol, one pattern, one hole, one line or one character or comprises punctate cutouts arranged in the shape of at least one symbol, one pattern, one hole, one line or one character, b) optionally thermoforming the layer produced in step a), c) subjecting the layer to film-insert molding with a thermoplastic molding compound containing A) at least one representative selected from the group consisting of aromatic polycarbonate and aromatic polyester carbonate, B) rubber-modified vinyl (co)polymer composed of B.1) 80% to 95% by weight, based on the rubber-modified vinyl (co)polymer B, of structural units derived from at least one vinyl monomer and B.2) 5% to 20% by weight, based on the rubber-modified vinyl (co)polymer B, of one or more elastomeric graft substrates having glass transition temperatures <−50° C. and containing at least 50% by weight, based on B.2, of structural units derived from 1,3-butadiene, wherein the rubber-modified vinyl (co)polymer B contains (i) a disperse phase consisting of (i.1) rubber particles grafted with vinyl (co)polymer composed of structural units of B.1 and (i.2) vinyl (co)polymer composed of structural units of B.1 enclosed in the rubber particles as a separate disperse phase and (ii) a rubber-free vinyl (co)polymer matrix consisting of structural units of B.1 which is not bonded to the rubber particles and is not enclosed in these rubber particles, wherein the disperse phase of (i) has a median diameter D50 measured by ultracentrifugation of 0.7 to 2.0 μm, C) optionally at least one further component selected from polymer additives and polymeric blend partners, wherein the thermoplastic molding compound contains less than 2% by weight of rubber-based graft polymers distinct from component B) and wherein the thermoplastic molding compound has a rubber content of at least 1.5% by weight.

* * * * *